E. S. FAIRBANKS.
CLUTCH.
APPLICATION FILED FEB. 17, 1916.
1,186,301.
Patented June 6, 1916.
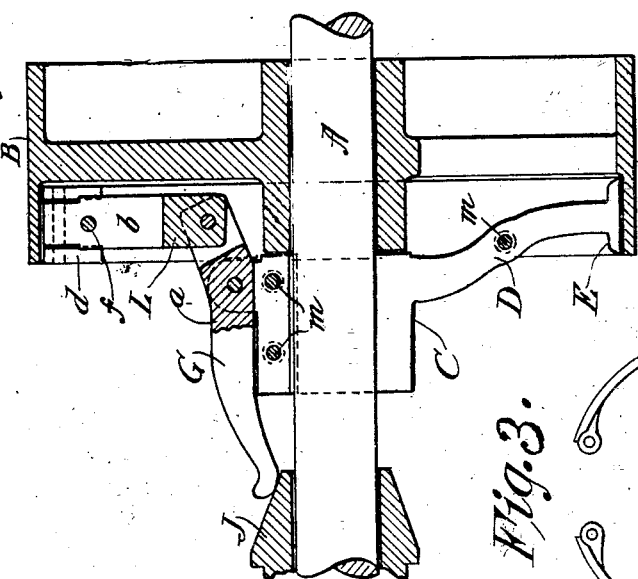
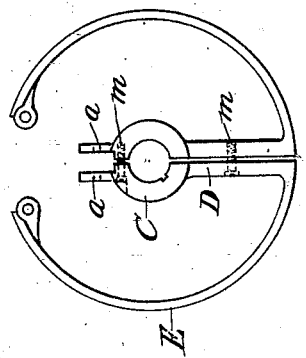
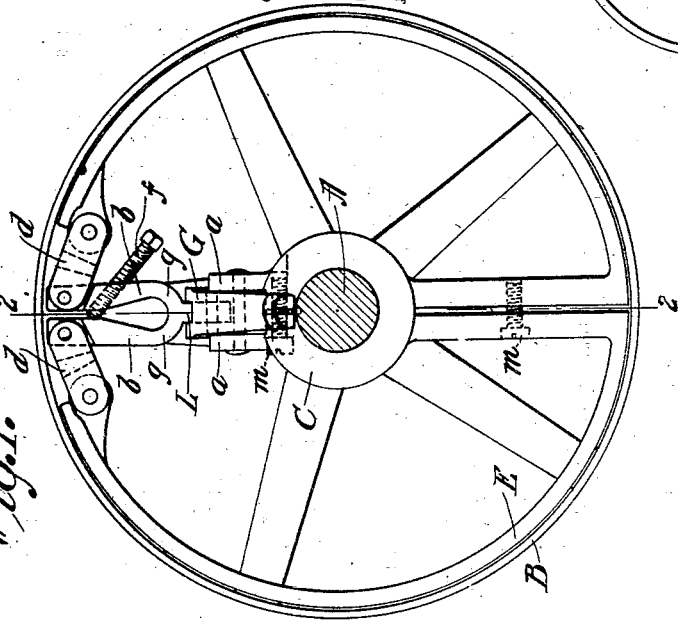
WITNESS:
INVENTOR,
Ernest S. Fairbanks,
BY
ATTORNEY.

UNITED STATES PATENT OFFICE.

ERNEST S. FAIRBANKS, OF GREENFIELD, MASSACHUSETTS.

CLUTCH.

1,186,301.  Specification of Letters Patent.  Patented June 6, 1916.

Application filed February 17, 1916. Serial No. 78,805.

*To all whom it may concern:*

Be it known that I, ERNEST S. FAIRBANKS, a citizen of the United States of America, and resident of Greenfield, in the county of Franklin and State of Massachusetts, have invented certain new and useful Improvements in Clutches, of which the following is a full, clear, and exact description.

This invention relates to improvements in friction clutches of the kind which comprises a split, and contractible and expansible ring closely located inside of the rim of a loose pulley and adapted through means of expanding devices to be placed in engagement with the pulley so that the latter must necessarily rotate as one with the shaft by which the split ring is revolubly carried.

An object of the present invention is to provide means whereby after protracted use and wear between the internal surfaces of the pulley and the external surfaces of the clutch ring the latter may have a normal increased degree of expansion for compensation for the wear.

Another object is to so construct the split ring that for its installation or replacement in its proper position on a line of shafting already set up the same may be done without the dismantling of the shafting and appurtenances thereof.

The invention is described in conjunction with the accompanying drawings and is set forth in the claims.

In the drawings: Figure 1 is a face view of the clutch as seen at right angles to the axis of the shaft. Fig. 2 is a sectional view on a plane at right angles to Fig. 1, and as indicated by line 2—2. Fig. 3 is a face view showing the sectional characteristic of the split ring.

In the drawings, A represents the shaft having the pulley B loose thereon; and C represents a hub keyed on and to rotate with the shaft and provided with an arm D extended toward the rim of the pulley and carrying a split ring E which is positioned closely inside of the pulley rim, and normally free or loose relatively to the latter. The said hub carries between radial ear pieces $a\ a$ thereof a lever G which is pivoted at an intermediate part thereof in said ear pieces, and such lever has coacting therewith the conical sliding collar J, very common and usual for the actuating devices of clutches.

L represents a piece pivotally connected to the inner end of the lever G, the same having spaced members $b\ b$ which are flexibly connected to such part L so as to be capable of deflection the one relatively to the other. To the outer ends of the said flexibly connected members $b\ b$, toggle links $d\ d$ are pivotally connected, said toggle links at their outer ends having pivotal connections with the separated ends of the split ring E. $f$ represents a screw having threading engagement through one of the said flexibly connected members $b$ and having by its end a crowding bearing against the other of said members so that, after wear between the engaging surfaces of the split ring and the rim of the pulley, by inwardly turning the screw to increase its inward projection, the one of the members $b$ is forced to increased separation from the other member, to, through the medium of the toggle links, increase the normal diameter of the split ring.

In Figs. 1 and 2 the part L is shown as constructed as an integral element including the portion for pivotal connection with the lever G and the members $b\ b$ formed as bifurcated extensions of the pivot connecting portion; but the crotch portions or integrally formed portions $g\ g$ at the junction between the members $b\ b$ and L are so reduced in thickness as to render the members $b\ b$ resilient and deflectable one relatively to the other and both relatively to the shank or pivotal connection portion L.

In Fig. 3 representation is made of a sectional and separable character or formation of the split expanding clutch ring E,—the ring in its installation, and functionally, being, to all intents and purposes the same as represented in Fig. 1 wherein the ring, its arm D and hub C are integrally formed; and with reference to Fig. 4 it will be seen that the hub, arm and split ring are divided on a plane diametrically of the hub, between the ear lugs $a\ a$ thereof and lengthwise of and between the edges of the arm; said separable sections being detachably connected as by screws $m\ m$ engaging through the hub at the base of the ear pieces and through an intermediate portion of the pivoted arm D.

I claim:—

1. In a friction clutch, in combination, a shaft, having a pulley loose thereon, a hub fixed on the shaft adjacent the pulley provided with an arm extending toward the rim of the pulley and carrying a split ring, positioned closely inside of the pulley rim, and said hub having a lever intermediately pivoted thereon, a pair of toggle links connected to the free ends of the split ring, a piece pivotally connected to one end of said lever and having spaced members flexibly connected thereto and having their outer ends pivotally connected to the inner ends of said toggle links, a screw having a threading engagement through one of said flexibly connected members and a crowding bearing against the other of said members, and the slide cone on the shaft coacting with said lever.

2. In a friction clutch, in combination, a shaft, having a pulley loose thereon, a hub fixed on the shaft provided with an arm extending toward the rim of the pulley and carrying a split ring, positioned closely inside of the pulley rim, and said hub having a lever intermediately pivoted thereon, a pair of toggle links connected to the free ends of the split ring, a radially arranged element having a portion thereof pivotally connected to one end of said lever and having its outer portion of bifurcated form, such bifurcated extremities being resilient relative to the lever connecting portion, and having their outer ends pivotally connected to the inner ends of said toggle links, and a screw having a threading engagement through one of the bifurcated portions and a crowding bearing against the other of said bifurcated portions.

3. In a friction clutch, in combination, a shaft, having a pulley loose thereon, and a hub fixed on the shaft provided with an arm extending toward the rim of the pulley and carrying a split ring, positioned closely inside of the pulley rim, and said hub having ear members to and between which a lever is intermediately pivoted, and said hub, arm and split ring being divided on a plane diametrically of the hub, between said ears and lengthwise of and between the edges of said arm, and having the opposite separable sections thereof detachably connected, a pair of toggle links connected to the free ends of the split ring, a piece pivotally connected to one end of said lever and having spaced members flexibly connected thereto and having their outer ends pivotally connected to the inner ends of said toggle links, and a screw having a threading engagement through one of said flexibly connected members and having by its end a crowding bearing against the other of said members.

Signed by me at Greenfield, Mass., in presence of two subscribing witnesses.

ERNEST S. FAIRBANKS.

Witnesses:
MARTIN L. WIENER,
MAURICE J. LEVY.